(12) United States Patent
Seroski et al.

(10) Patent No.: US 10,588,294 B1
(45) Date of Patent: *Mar. 17, 2020

(54) IMPACT-ACTIVATED ILLUMINATING LEG WRAP

(71) Applicants: David Michael Seroski, Trabuco Canyon, CA (US); Susan K Seroski, Trabuco Canyon, CA (US)

(72) Inventors: David Michael Seroski, Trabuco Canyon, CA (US); Susan K Seroski, Trabuco Canyon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,811

(22) Filed: Feb. 20, 2019

Related U.S. Application Data

(63) Continuation of application No. 15/277,864, filed on Sep. 27, 2016, now Pat. No. 10,264,764.

(51) Int. Cl.
*A01K 13/00* (2006.01)
*A01K 11/00* (2006.01)

(52) U.S. Cl.
CPC .......... *A01K 13/007* (2013.01); *A01K 11/00* (2013.01)

(58) Field of Classification Search
CPC .............................. A01K 13/007; A01K 11/00
USPC .......................................................... 119/850
See application file for complete search history.

(56) References Cited

U.S. PATENT DOCUMENTS

| 2005/0092260 A1* | 5/2005 | Paxton | A01K 13/007 119/850 |
| 2007/0044734 A1* | 3/2007 | Maloney | A01K 13/007 119/850 |
| 2007/0074677 A1* | 4/2007 | Behme | A01K 13/007 119/850 |
| 2009/0188445 A1* | 7/2009 | Jacobsen | A01K 13/007 119/850 |
| 2009/0288377 A1* | 11/2009 | Heid | A01K 13/007 54/82 |
| 2012/0206906 A1* | 8/2012 | Gindi | A01K 27/006 362/103 |

FOREIGN PATENT DOCUMENTS

EP 0086651 A2 * 8/1983 ............. G08B 5/004

* cited by examiner

*Primary Examiner* — Monica L Williams
*Assistant Examiner* — Aaron M Rodziwicz
(74) *Attorney, Agent, or Firm* — Plager Schack LLP; Mark H. Plager; Michael J. O'Brien

(57) ABSTRACT

An impact-activated illuminating leg wrap is configured to provide light on a moving animal. The impact-activated illuminating leg wrap includes a first layer joined to a second layer wherein the second layer further comprises a hook fastener. An upper strap is fixed to the loop fastener and attached to an upper strap loop fastener. The upper strap is adapted to be wrapped around a leg of an animal forming a rear leg wrap concave contour. An upper reflective strap is attached to the hook fastener and perforated with a series of upper reflective strap perforations. A series of upper reflective strap light emitting diodes is inserted through the series of upper reflective strap perforations and connected to the upper reflective strap. A first microcontroller is attached to the second layer with a first elastic strap.

5 Claims, 6 Drawing Sheets

IMPACT-ACTIVATED ILLUMINATING LEG WRAP

RELATED APPLICATIONS

This application is a continuation of Non-provisional patent application U.S. Ser. No. 15/277,864 filed on Sep. 27, 2016.

BACKGROUND

The embodiments herein relate generally to an impact-activated illuminating leg wrap for animals, especially horses. The wrap when put on the animal alerts others of its location and provides direction of travel to a distant observer in dark.

Prior to embodiments of the disclosed invention either utilized energy inefficient lighting system or depended on reflected light, useful only for short distances visibility.

SUMMARY

An impact-activated illuminating leg wrap is configured to provide light on a moving animal. The impact-activated illuminating leg wrap includes a first layer joined to a second layer wherein the second layer further comprises a hook fastener. An upper strap is fixed to the loop fastener and attached to an upper strap loop fastener. The upper strap is adapted to be wrapped around a leg of an animal forming a rear leg wrap concave contour. An upper reflective strap is attached to the hook fastener and perforated with a series of upper reflective strap perforations. A series of upper reflective strap light emitting diodes is inserted through the series of upper reflective strap perforations and connected to the upper reflective strap. A first microcontroller is attached to the second layer with a first elastic strap. The first microcontroller further comprises an accelerometer and a battery and is configured with instructions to: receive input from the accelerometer about movement. Then, to close a circuit between the battery and the series of upper reflective strap light emitting diodes when the accelerometer detects movement in a direction of the rear leg wrap concave contour.

In some embodiments, a lower strap is fixed to the loop fastener and attached to a lower strap loop fastener; wherein the lower strap is adapted to be wrapped around a leg of an animal forming a rear leg wrap concave contour. A lower reflective strap is attached to the hook fastener and perforated with a series of lower reflective strap perforations. A series of lower reflective strap light emitting diodes are inserted through the series of lower reflective strap perforations and connected to the lower reflective strap. A second microcontroller is attached to the second layer with a first elastic strap and further communicatively coupled to the series of lower reflective strap light emitting diodes.

In some embodiments, a central strap is attached to the second layer. The central strap is further attached to a central strap loop fastener.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 7:
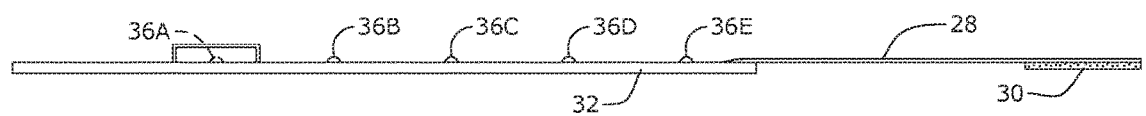
FIG. 7 shows a side view of an embodiment of the invention
Figure 7A:
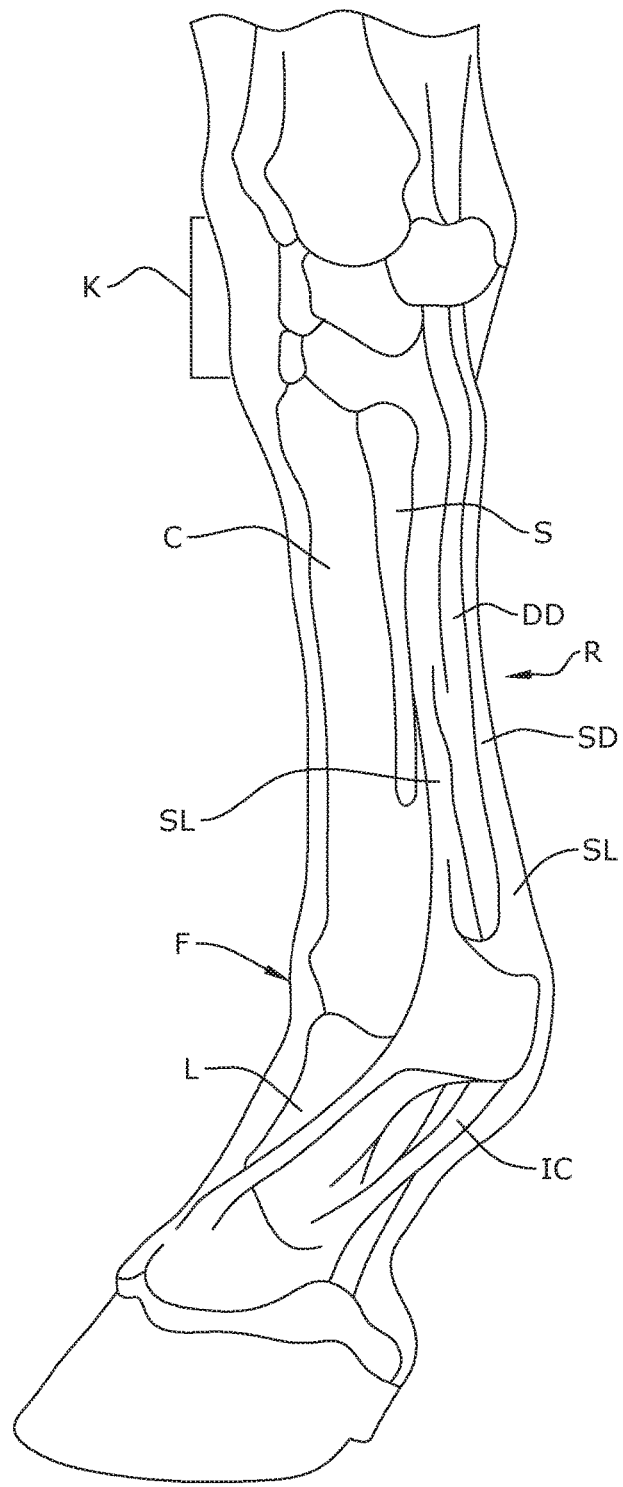
Figure 7B:
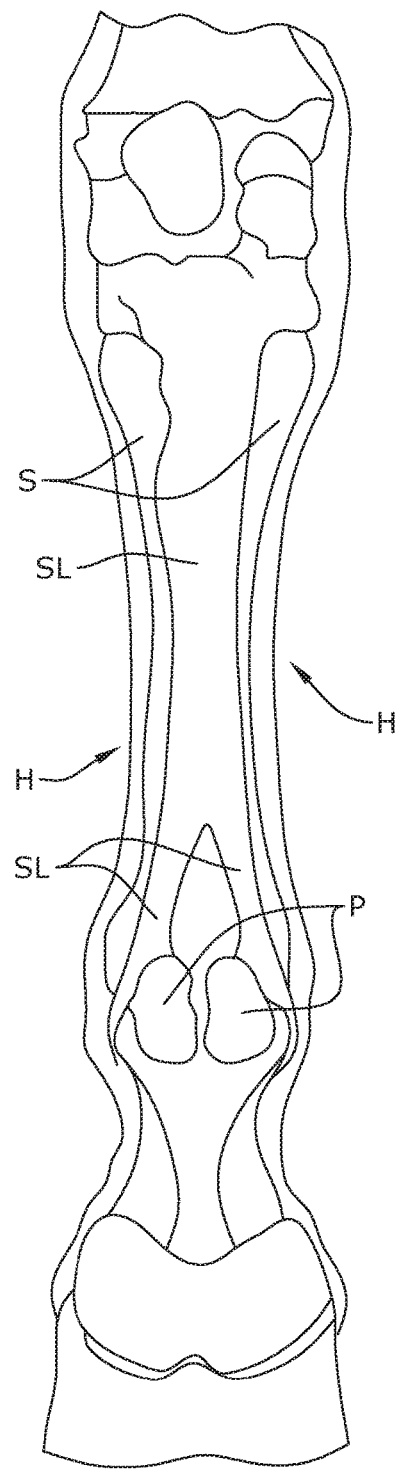
Figure 8A:
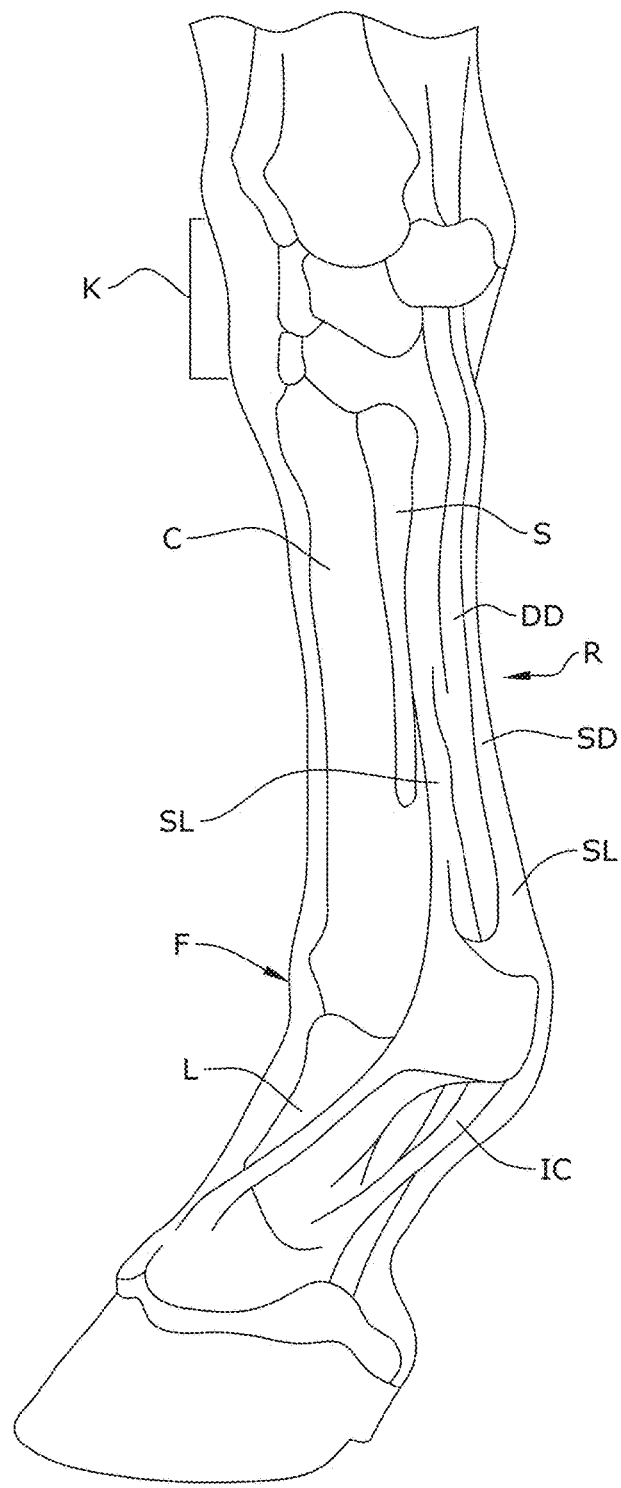
FIG. 8A shows the anatomy of an exemplary horse.
Figure 8B:
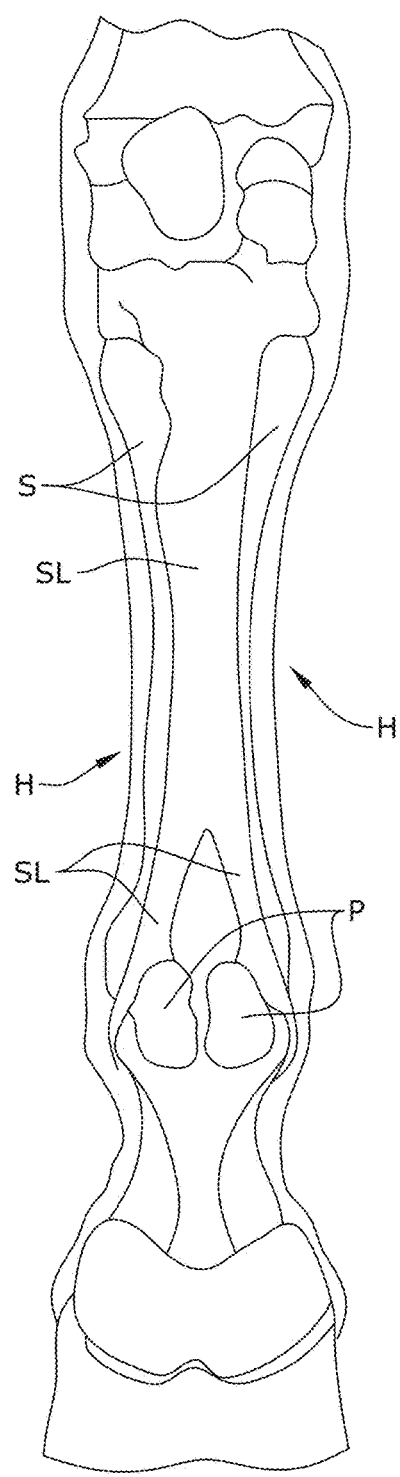
FIG. 8B shows the anatomy of an exemplary horse.

Turning first to FIGS. 7A and 7B, with regard to the gross anatomy of the horse, below the knee K is cannon bone C (sometimes called the third metacarpal that is) adjacent to split bones S (which include the second or medial and fourth or lateral metacarpals). Cannon bone C terminates in the sesamoid bones P which form the fetlock joint F with the long pastern L (also called the proximal phalanx). The fetlock joint F is connected to the knee with the deep digital flexor tendon DD, the superficial digital flexor tendon SD, the inferior cheek ligament IC and the suspensory ligament SL. Turning to FIG. 7A, this application defines a leg rear concave contour R as having the shape of the shape of the deep digital flexor tendon DD, the superficial digital flexor tendon SD, the inferior cheek ligament IC and the suspensory ligament SL, that is extending from the Fetlock joint F forward to the cannon bone C and the rearward toward the knee K. This application defines the leg hourglass contours H as the shape of the splint bones S extending inward and then the cannon bone extending outward moving upward to downward on the horse's leg.

Figure 1:
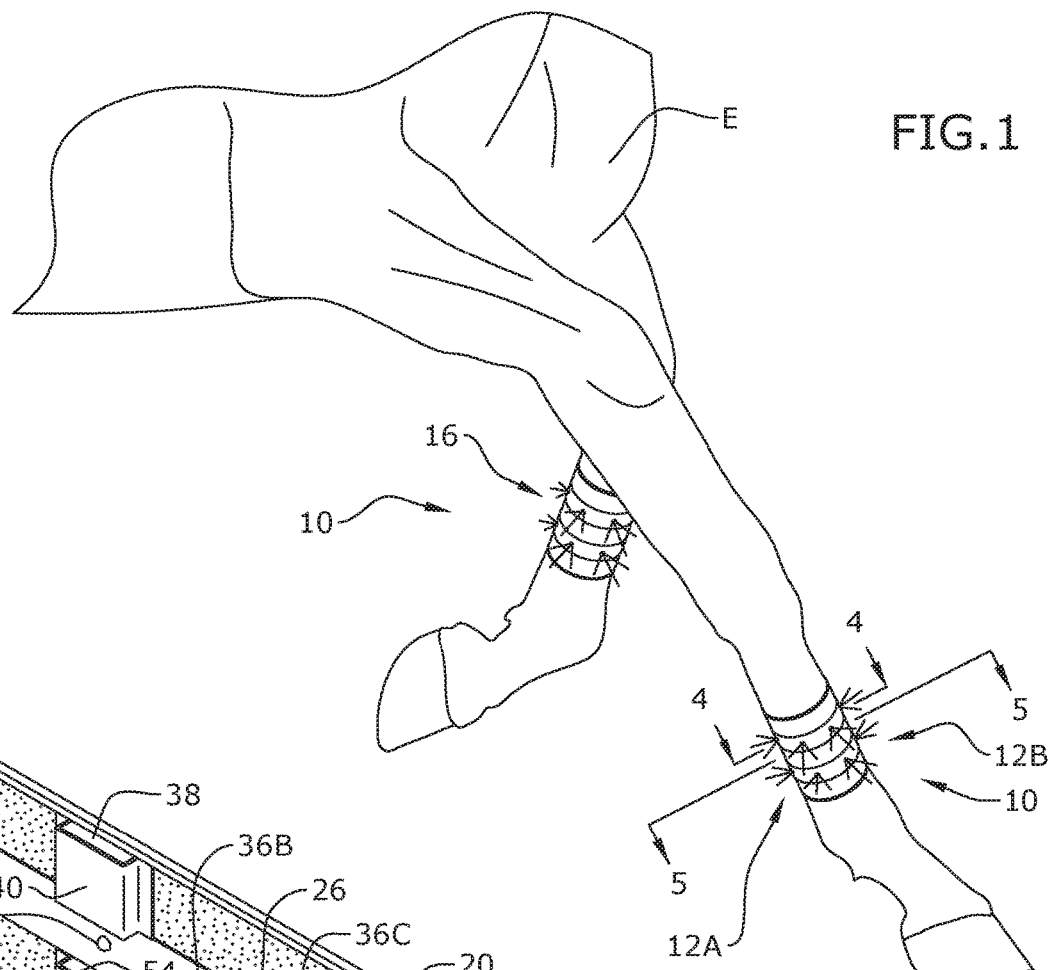
FIG. 1 shows a perspective view of embodiment of the present invention in use.
Figure 2:
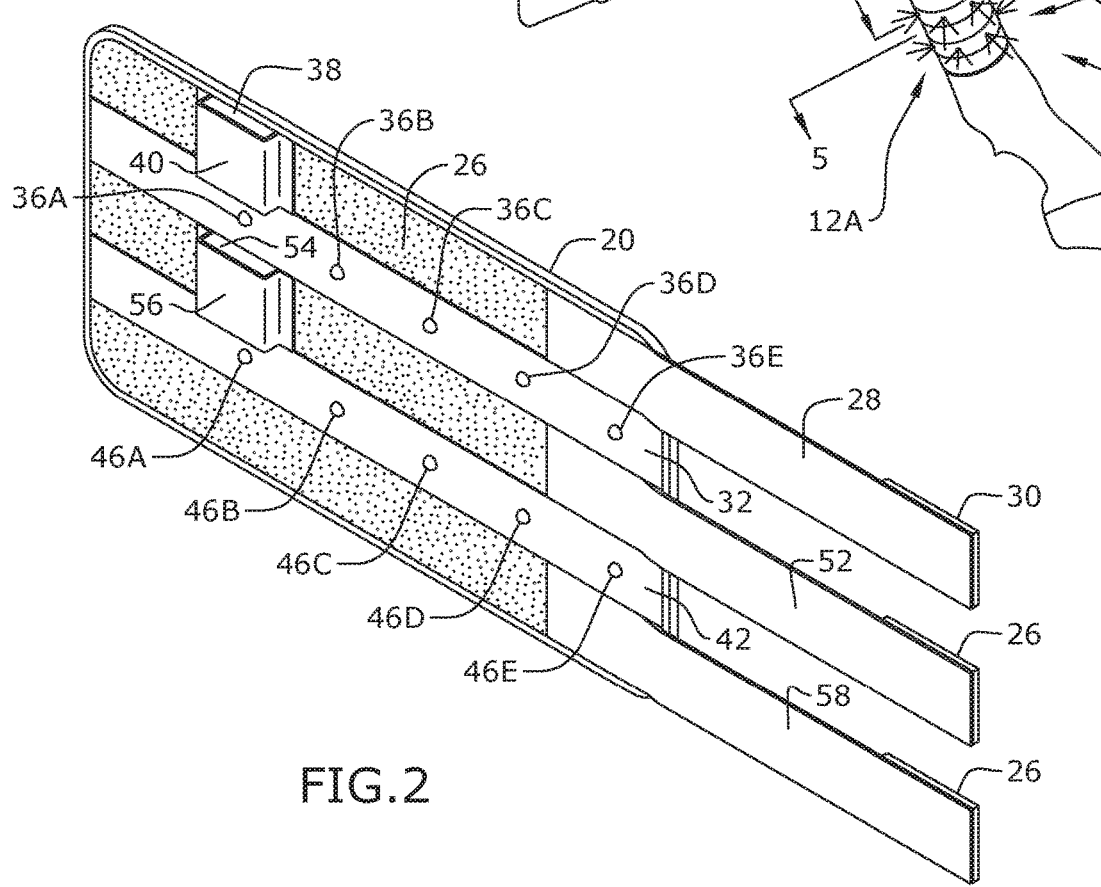
FIG. 2 shows a perspective view of an embodiment of the invention.
Figure 3:
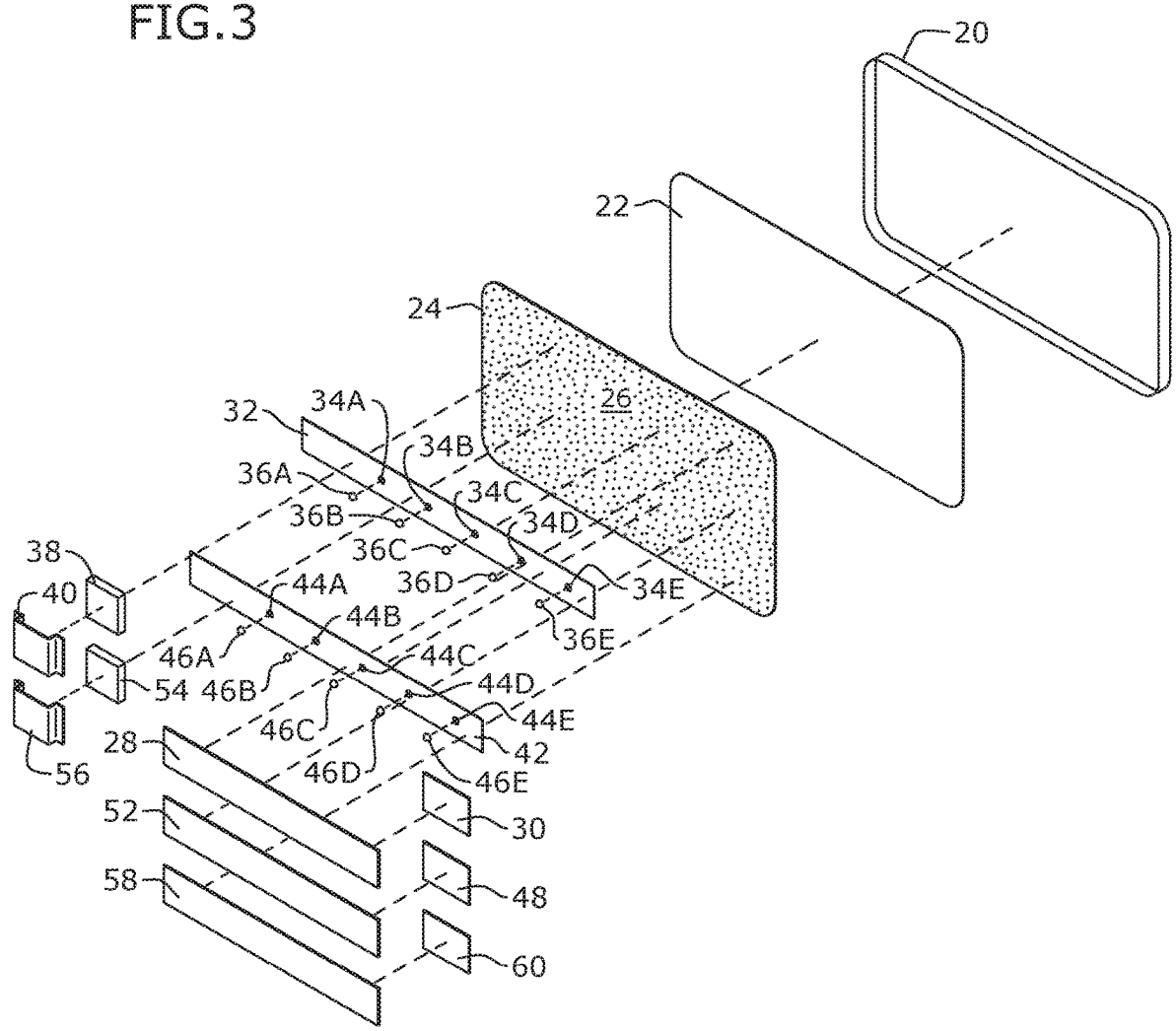
FIG. 3 shows an exploded view of an embodiment of the invention.
Figure 4:
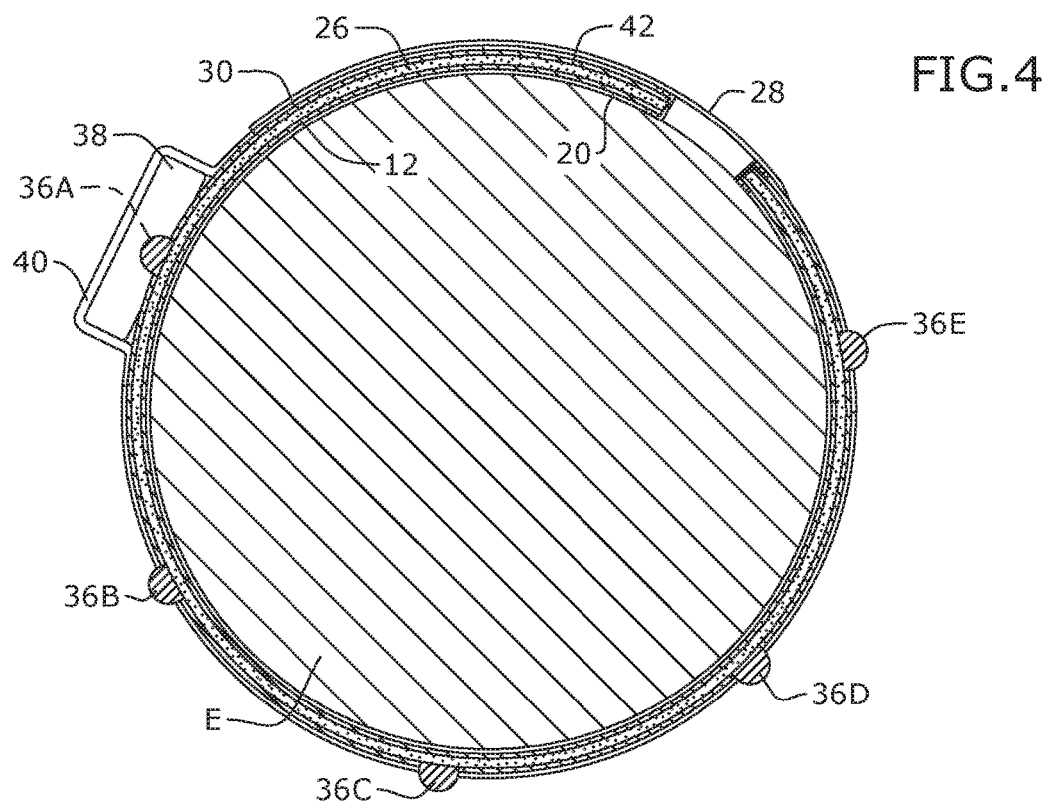
FIG. 4 shows a section view of an embodiment of the invention taken from line 4-4 in FIG. 1.
Figure 5:
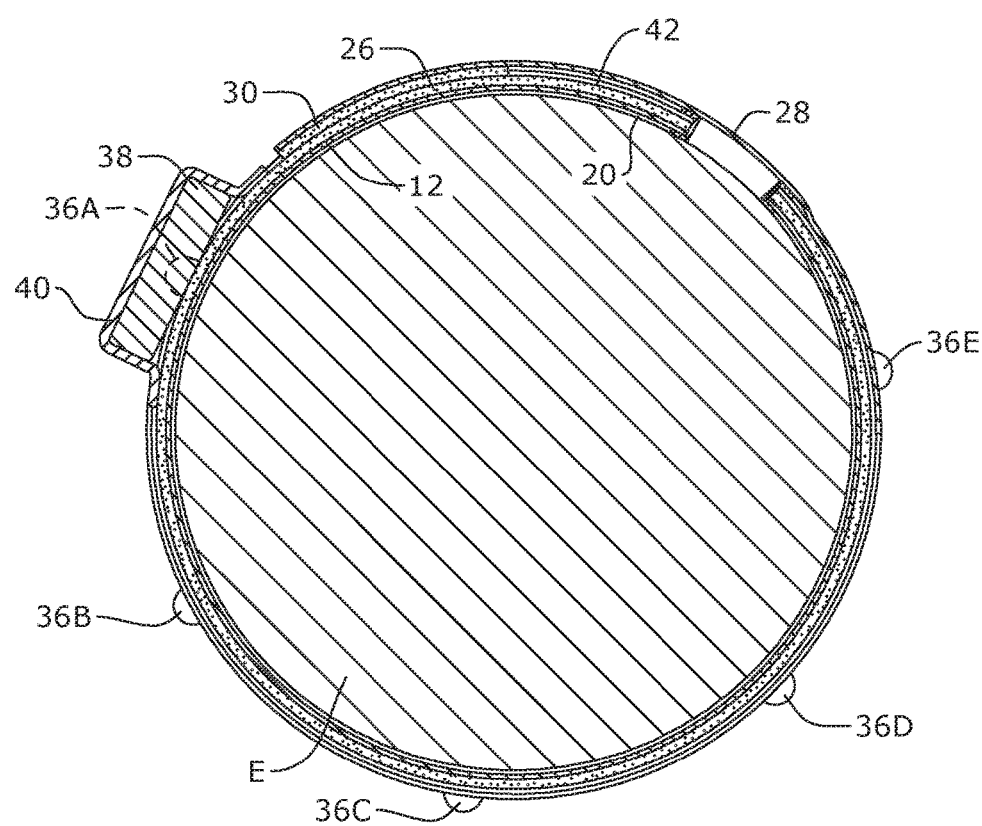
FIG. 5 shows a section view of an embodiment of the invention taken from line 5-5 in FIG. 1.

With that anatomy in mind, turning to FIG. 1, horse E is shown wearing impact-activated illuminating leg wrap 10. Impact-activated illuminating leg wrap 10 further comprises leg wrap hourglass contours 12A, 12B which reflect the shape of leg hourglass contours H. Impact-activated illuminating leg wrap 10 further comprises rear leg wrap concave contour 16, which reflects the shape of leg rear concave contour R.

Turning to FIGS. 2-7, impact-activated illuminating leg wrap 10 further comprises edging 20. Edging 20 is wrapped around first layer 22. First layer 22 can be made from a water proof fabric. First layer 22 is joined to second layer 24. Second layer 24 further comprises hook fastener 26.

Second layer 24 is joined to upper strap 28. Upper strap 28 is attached to upper strap loop fastener 30. Second lawer 24 is joined to upper reflective strap 32. Upper reflective strap 32 is perforated with a series of upper reflective strap perforations 34A, 34B, 34C, 34D and 34E. A series of upper reflective strap light emitting diodes 36A, 36B, 36C, 36D and 36E are joined inserted through the series of upper reflective strap perforations 34A, 34B, 34C, 34D and 34E and connected to upper reflective strap 32.

Second layer 24 is further attached to first microcontroller 38 with first elastic strap 40. First microcontroller 38 further comprises an accelerometer and a battery and is configured with instructions to closes a circuit between the batter and the series of upper reflective strap light emitting diodes 36A, 36B, 36C, 36D and 36E with first wire 64 when the accelerometer detects movement in the direction of the rear leg wrap concave contour 16 or contrary to that direction.

Second layer 24 is joined to lower reflective strap 42. Lower reflective strap 42 is perforated with a series of lower reflective strap perforations 44A, 44B, 44C, 44D and 44E. A series of lower reflective strap light emitting diodes 46A, 46B, 46C, 46D and 46E are joined inserted through the series of lower reflective strap perforations 44A, 44B, 44C, 44D and 44E and connected to lower reflective strap 42. Second layer 24 is further attached central strap 52. Central strap 52 is further attached to central strap loop fastener 48.

Figure 6:
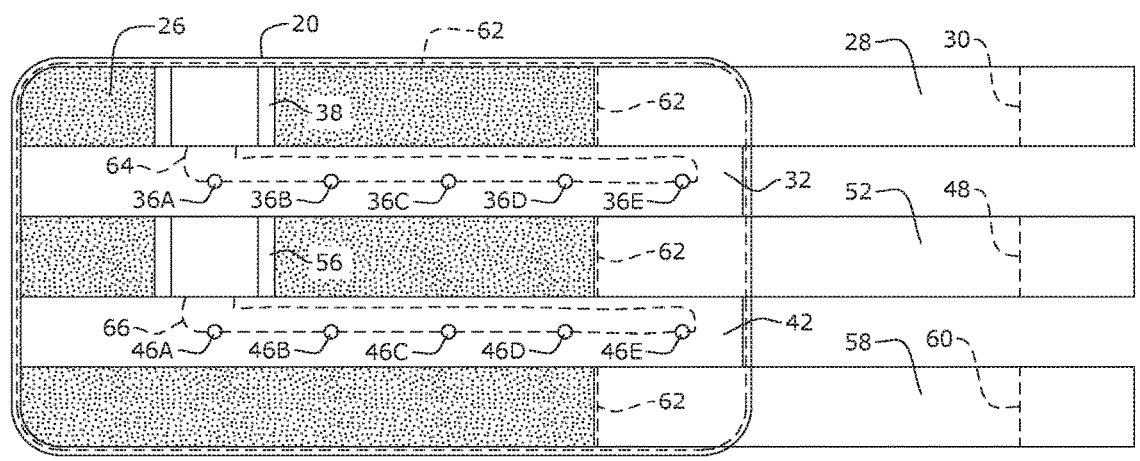
FIG. 6 shows a front view of an embodiment of the invention.

Second layer 24 is further attached to second microcontroller 54 with second elastic strap 56. Second microcontroller 54 further comprises an accelerometer and a battery and is configured with instructions to closes a circuit between the battery and the series of lower reflective strap light emitting diodes 46A, 46B, 46C, 46D and 46E with second wire 66 when the accelerometer detects movement in the direction of the rear leg wrap concave contour 16 or contrary to that direction. Second layer 24 is further attached lower strap 58. Lower strap 58 is further attached to lower strap loop fastener 60. Turning to FIG. 6, stitching 62 can be used to hold many of these components together.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An impact-activated illuminating leg wrap, configured to provide light on a moving animal; the impact-activated illuminating leg wrap comprising:
    a first layer joined to a second layer;
    edging wrapped around the first layer creating a raised periphery around the first layer;
    an upper strap, fixed to the second layer; wherein the upper strap is adapted to be wrapped around a leg of an animal forming a rear leg wrap concave contour;
    an upper reflective strap, attached to the upper strap and perforated with a series of upper reflective strap perforations;
    a series of upper reflective strap light emitting diodes, inserted through the series of upper reflective strap perforations and connected to the upper reflective strap;
    a first microcontroller, attached to the second layer; wherein the first microcontroller further comprises an accelerometer and a battery and is configured with instructions to:
    receive input from the accelerometer about movement; and
    close a circuit between the battery and the series of upper reflective strap light emitting diodes when the accelerometer detects movement in a direction of the rear leg wrap concave contour.

2. The impact-activated illuminating leg wrap of claim 1, wherein the first microcontroller is attached to the second layer with a first elastic strap.

3. The impact-activated illuminating leg wrap of claim 1, wherein the second layer further comprises a hook fastener.

4. The impact-activated illuminating leg wrap of claim 1, further comprising:
    a lower strap, fixed to the second layer; wherein the lower strap is adapted to be wrapped around a leg of an animal forming a rear leg wrap concave contour;
    a lower reflective strap, attached to the lower strap and perforated with a series of lower reflective strap perforations;
    a series of lower reflective strap light emitting diodes, inserted through the series of lower reflective strap perforations and connected to the lower reflective strap;
    a second microcontroller, attached to the second layer and further communicatively coupled to the series of lower reflective strap light emitting diodes.

5. The impact-activated illuminating leg wrap of claim 4, further comprising a central strap, attached to the second layer.

* * * * *